(12) United States Patent
DePrez et al.

(10) Patent No.: US 7,099,751 B2
(45) Date of Patent: Aug. 29, 2006

(54) DRIVE-BY-WIRELESS VEHICLE CONTROL

(75) Inventors: Mary K. DePrez, New Castle, IN (US); Rommel H. Racelis, Ann Arbor, MI (US); Michael A. Crowder, Washington, MI (US); Lawrence C. Wehner, Lake Orion, MI (US)

(73) Assignee: Electronic Data Systems Corporation, Plano, TX (US)

( * ) Notice: Subject to any disclaimer, the term of this patent is extended or adjusted under 35 U.S.C. 154(b) by 194 days.

(21) Appl. No.: 10/260,527

(22) Filed: Oct. 1, 2002

(65) Prior Publication Data

US 2004/0064221 A1 Apr. 1, 2004

(51) Int. Cl.
*H04B 7/005* (2006.01)
*G08C 17/00* (2006.01)
*G06F 17/00* (2006.01)

(52) U.S. Cl. ............... 701/2; 701/33; 701/36; 455/151.4; 455/152.1

(58) Field of Classification Search ............ 701/2, 701/33, 41, 45, 1, 36; 455/423, 151.4, 152.1; 340/825.69
See application file for complete search history.

(56) References Cited

U.S. PATENT DOCUMENTS

| | | | |
|---|---|---|---|
| 4,741,409 A | | 5/1988 | Westercamp et al. ........ 180/413 |
| 5,471,668 A | * | 11/1995 | Soenen et al. ............... 455/352 |
| 5,625,558 A | | 4/1997 | Togai et al. .................. 701/93 |
| 5,767,588 A | * | 6/1998 | Nakaya et al. ............ 307/10.2 |
| 5,781,871 A | * | 7/1998 | Mezger et al. ............. 455/424 |
| 5,833,025 A | | 11/1998 | Bhandari ................... 180/178 |
| 6,030,316 A | | 2/2000 | Kadota ....................... 477/121 |
| 6,078,252 A | * | 6/2000 | Kulczycki et al. ....... 340/425.5 |
| 6,144,114 A | * | 11/2000 | Chutorash .................. 307/10.5 |
| 6,144,288 A | * | 11/2000 | Jahn et al. ............... 340/10.33 |
| 6,177,867 B1 | * | 1/2001 | Simon et al. ............... 340/468 |
| 6,345,681 B1 | | 2/2002 | Hackl et al. ................ 180/402 |
| 6,411,882 B1 | | 6/2002 | Bidner et al. ................ 701/93 |
| 2002/0198653 A1 | * | 12/2002 | Lutter ....................... 701/209 |

FOREIGN PATENT DOCUMENTS

DE 197 28 083 A1 2/1999
WO WO 00/72463 A2 11/2000

* cited by examiner

*Primary Examiner*—Tan Q. Nguyen
(74) *Attorney, Agent, or Firm*—Fish & Richardson P.C.

(57) ABSTRACT

Drive-by-wireless vehicle control techniques use a wireless connection between a sensor module and a control module. An action by the driver of the vehicle is detected by the sensor module and communicated to the control module using a message sent using a wireless communication pathway. The control module directs the appropriate vehicle component based on the wireless message received. The vehicle identification number (VIN) that uniquely identifies the vehicle is used to identify a wireless message has been sent from a sensor module that is part of the vehicle. The use of the VIN to identify a wireless message that applies to a particular vehicle that has been assigned the same VIN may help ensure that the particular vehicle is directed only based on actions by the driver of the particular vehicle.

20 Claims, 5 Drawing Sheets

DRIVE-BY-WIRELESS VEHICLE CONTROL

TECHNICAL FIELD

This description relates to techniques for using wireless networks to control steering, braking, accelerating, and other functions in an automobile or other type of a vehicle.

BACKGROUND

Traditional hydraulic or mechanical methods of steering, braking, accelerating and otherwise controlling an automobile or other type of vehicle may be directed by drive-by-wire techniques. In general, drive-by-wire techniques may replace a mechanical or hydraulic connection between a control device and an associated vehicle component with a wired connection. The wired connection may transmit electronic messages to direct a vehicle component based on action taken by a driver of the vehicle.

Drive-by-wire techniques may use a sensor module to detect a control action by a driver of a vehicle. A control action may include, for example, turning a steering wheel, depressing a brake pedal, or depressing an accelerator pedal. The sensor module converts the detected action into a digital signal and uses a wire connection to send the digital signal to a control module. The control module physically controls a vehicle component to perform an action in response to the received digital signal. For example, to steer an automobile using drive-by-wire techniques, a sensor module detects the direction in which the driver of the automobile turns the steering wheel. The sensor module uses a wired connection to send a digital signal to a control module that physically controls the front wheels of the automobile. The control module receives the message and turns the front wheels in the direction indicated by the received signal.

SUMMARY

In one general aspect, controlling a component in a vehicle includes detecting a control action in the vehicle. A message describing the detected control action and including a vehicle identification number is sent using a wireless communication pathway. The message is received and a determination is made as to whether the vehicle identification number included in the message matches a vehicle identification number of a vehicle at which the message is received. When the vehicle identification number matches, a component of the vehicle is controlled based on the received message.

Implementations may include one or more of the following features. For example, detecting a control action may include detecting an accelerator pedal being pressed, and controlling a component of the vehicle may include controlling a throttle of the vehicle. Detecting a control action also may include detecting the turning of a steering wheel or the pressing of a brake pedal, and controlling a component of the vehicle may include controlling a steering mechanism or a hydraulic brake system of the vehicle.

An acknowledgment message including the vehicle identification number of the vehicle may be sent using the wireless communication pathway. A determination may be made as to whether the wireless communication pathway is operational. The engine of the vehicle may be prevented from starting or the vehicle may be prevented from being placed in gear when the wireless communication pathway is not operational. The vehicle may be, for example, an automobile, a bus, a truck, or a train.

Techniques for controlling steering, braking, accelerating, and other vehicle functions may eliminate wired connections between one or more sensors and one or more control modules so as to, in turn, eliminate associated design, installation and maintenance costs of those wired connections. When a wire connecting the sensor module and control module is disconnected or broken, the control functions are disabled. The possibility of the malfunction of one or more wires may be eliminated through the use of a wireless network. The complexity of maintenance, problem solving, and repair may be reduced when wiring has been eliminated as a possible source of malfunction. In some wired networks, all modules may communicate using the same network of wired connections. The capacity of the wired network may become congested and develop unacceptable latency. A wireless network for controlling vehicle functions may reduce the capacity limits associated with a wired network. A wireless network also may increase the flexibility of design options because sensor modules and control modules may be located without regard for wiring requirements. The installation of sensor modules and control modules may be easier when wires need not be installed between a sensor module and a control module.

Implementations of the techniques discussed above may include a method or process, a system or apparatus, computer software on a computer-accessible medium, or a vehicle.

The details of one or more of the implementations are set forth below. Other features will be apparent from the description and drawings, and from the claims.

DESCRIPTION OF THE DRAWINGS

Like reference symbols in the various drawings indicate like elements.

DETAIL DESCRIPTION

The described drive-by-wireless vehicle control techniques use a wireless connection between a sensor module and a control module. An action by the driver of the vehicle is detected by the sensor module and communicated to the control module through a message sent using a wireless communication pathway. The control module directs the appropriate vehicle component based on the wireless message received. The vehicle identification number (VIN) that uniquely identifies the vehicle is used to confirm that a received wireless message has been sent from a sensor module that is part of the vehicle. The use of the VIN to confirm that a wireless message applies to a particular vehicle helps to ensure that the particular vehicle is directed only based on actions by the driver of the particular vehicle.

Figure 1:
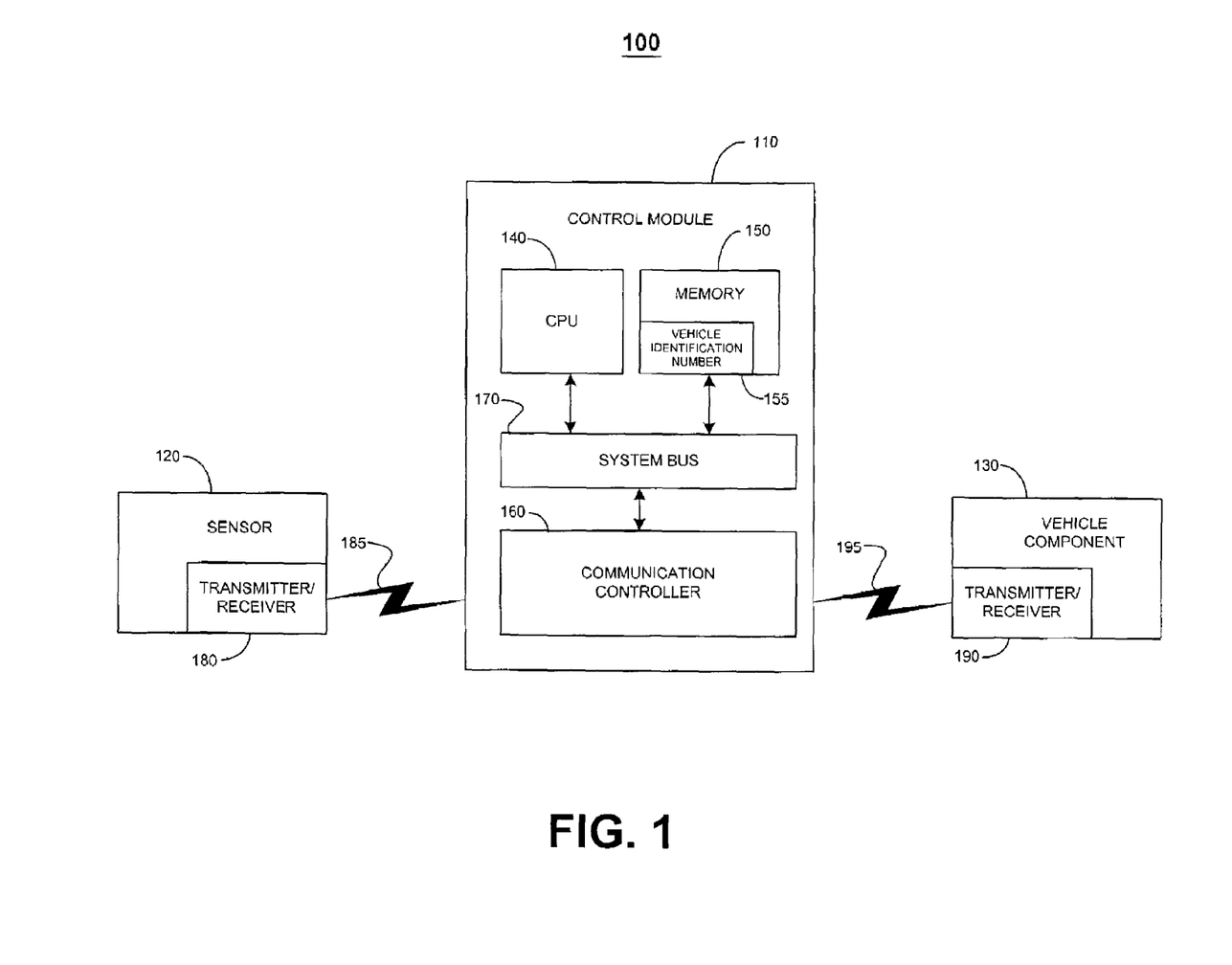
FIG. 1 is a block diagram of a drive-by-wireless system for controlling components of a vehicle.

Referring to FIG. 1, a drive-by-wireless system 100 controls components of a vehicle based on actions performed by the driver of the vehicle. The drive-by-wireless system 100 includes a control module 110, one or more sensor modules 120, and one or more vehicle components 130. For brevity, only one sensor module 120 and only one vehicle component 130 are shown. The control module 110 includes a central processing unit (CPU) 140 for processing executable instructions and a memory 150 that stores executable instructions and data, including a VIN 155. The VIN 155 uniquely identifies the vehicle that includes the drive-by-wireless system. The VIN 155 may be the Vehicle Identification Number that is generally recognized as a vehicle identifier for regulatory purposes. The VIN 155 also may be another type of identifier that uniquely identifies the vehicle. A communication controller 160 is capable of sending and receiving wireless communications. A system bus 170 provides a series of parallel connections to allow communication between CPU 140, the memory 150, and the communication controller 160.

The sensor module 120 includes a transmitter/receiver 180. The sensor module 120 and the control module 110 are capable of delivering and exchanging messages through a wireless communication pathway 185. Similarly, the vehicle component 130 includes a transmitter/receiver 190. The vehicle component 130 and the control module 110 are capable of delivering and exchanging messages through a wireless communication pathway 195.

Each wireless communication pathway 185 or 195 may be analog or digital. For example, a wireless communication pathway 185 or 195 may use wireless technology based on the Bluetooth standard for short-range wireless communications. A wireless communication pathway 185 or 195 also may use wireless technology based on other personal area network (PAN) technologies, the Institute of Electrical and Electronics Engineers, Inc. (IEEE) 802.11 standard (such as 802.11b or 802.11a), or other wireless network technology, such as the HiperLan2 standard by the European Telecommunications Standards Institute (ETSI). A wireless communication pathway 185 or 195 also may be based on other analog or digital wireless technology, such as the wireless technology used in cordless telephones. Wireless technology used in cordless telephones, for example, may use the 43–50 megahertz (MHz) band, the 900 MHz band, the 2.4 gigahertz (GHz) band, or another band of the radio spectrum. Some types of wireless technologies may provide a benefit over other types of wireless technology. For example, the use of cordless telephone wireless technology may be beneficial because the broadcast range is smaller when compared to other wireless technologies. A smaller broadcast range may result in receipt of fewer drive-by-wireless messages from other vehicles. The radio spectrum used by the cordless telephone wireless technology, however, may be generally more crowded than areas of the spectrum used by other wireless technology. The use of wireless technology other than wireless technology used for cordless telephones may result in receipt of fewer wireless messages that are not related to drive-by-wireless technology.

The sensor module 120 detects a control action by the driver of a vehicle. For example, the sensor module may detect a control action such as the driver turning a steering wheel, depressing a brake pedal, depressing an accelerator pedal, activating a cruise control function, or pressing a radio or other entertainment device control button. Typically, a sensor module 120 is associated with a particular device capable of indicating a control action by the driver. For example, different sensor modules may be associated with an accelerator pedal, a steering wheel, and a brake pedal. The sensor module 120 functions as an input/output point for a wireless connection through the wireless communication pathway 185 to the control module 110. The sensor module 120 sends a message to the control module 110 that includes the VIN associated with the vehicle and an indication of the control action performed by the driver.

Other modules may detect events other than control actions by the driver. For example, a sensor module may detect the rotations-per-minute of the vehicle's engine or the level of fuel in the vehicle's fuel tank.

The control module 110 receives through communication pathway 185 the message sent by the sensor module 120. The control module 110 uses the VIN in the received message to determine whether to send a message to control the vehicle component 130. The use of the VIN to identify which messages received by the control module 110 apply to the vehicle may provide security to ensure that the control module 110 does not control the vehicle other than as directed by the driver of the vehicle. For example, in addition to receiving wireless messages sent by the sensor module 120, the control module 110 may receive a wireless message that has been sent by sensor modules of other vehicles. The control module 110 also may receive a wireless message that has not been sent by any vehicle (e.g., a wireless message sent by a personal digital assistant (PDA), a cellular telephone, or a laptop computer). The control module 110 controls the vehicle component 130 only when a wireless message is received that identifies the VIN of the vehicle to be controlled.

The control module 110 determines what action is required by the vehicle component 130 based on the message received from the sensor module 120. The control module 110 then sends an appropriate message to control the vehicle component 130 using communication pathway 195. The vehicle component 130 receives through the transmitter/receiver 190 the message sent from control module 110. The vehicle component 130 responds appropriately to the message received. The vehicle component 130 then may send an acknowledgment message to the control module 110. The control module 110 receives the acknowledgment message and sends the acknowledgment message to the sensor module 120. Some implementations may use different handshaking approaches to provide acknowledgment of received messages.

In implementations that use a control module to support control functions by more than one sensor, the control module may act as a communications hub to receive messages from and transmit messages to various sensors in the vehicle. Similarly, in implementations that use a control module to provide control functions to more than one vehicle component, the control module may act as a communications hub to receive messages from and transmit messages to various vehicle components in the vehicle. In general, reducing the number of control modules used to communicate with various sensors and vehicle components may be beneficial. For example, the design complexity of the drive-by-wireless system may be reduced.

In implementations that use more than one control module to support control functions by more than one sensor and communicate messages to more than one vehicle component, permitting more than one control module to be active at a time may provide an advantage. For example, when more than one control module is permitted to be active at a time, wireless message congestion between a particular sensor and a particular control module may be reduced. Similarly, wireless message congestion between a particular vehicle component and a particular control module may be reduced. In some implementations, a second control module may be included in a vehicle to provide redundancy in the event that a primary control module ever becomes inoperable.

Figure 2:
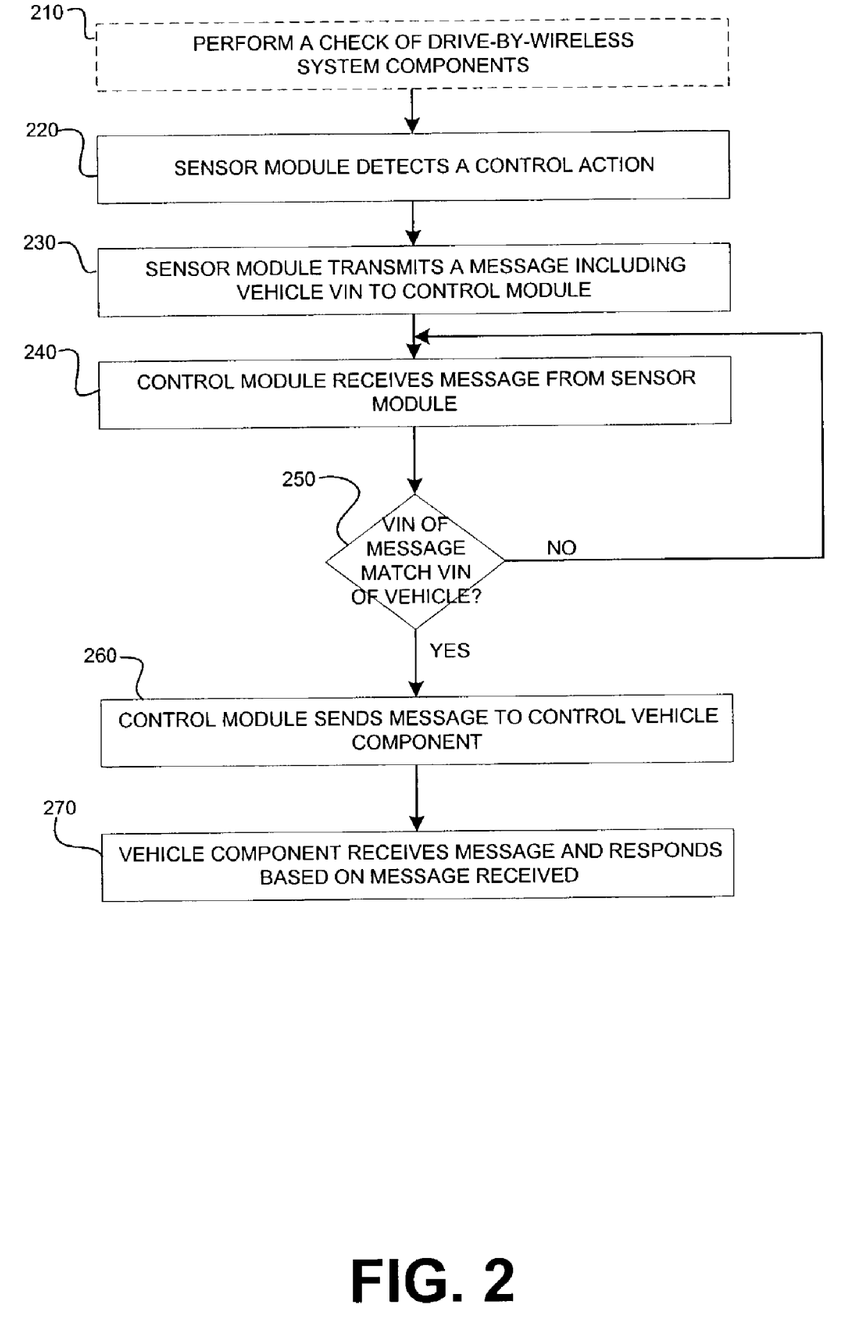
FIG. 2 is a flow chart of a process implemented by the drive-by-wireless system of FIG. 1.

Referring to FIG. 2, a process 200 may be used by the drive-by-wireless system 100 to control components of a vehicle based on actions performed by the driver of the vehicle. The process 200 may begin when the system performs a check of the drive-by-wireless system components (step 210). Such a check may be initiated when the engine of the vehicle is started. For example, a control module in the drive-by-wireless system, such as the control module 110 of FIG. 1, may perform the check by sending a message to each component (such as each sensor module and each vehicle component) in the drive-by-wireless system and waiting for an acknowledgment from each component. The drive-by-wireless system may permit the engine to be started or the vehicle to be placed in gear only when all drive-by-wireless components acknowledge the message sent by the control module.

In some implementations, the control module may permit the engine to be started and/or the vehicle to be placed in gear when one or more particular sensor modules or one or more particular vehicle components do not acknowledge the message sent by the control module. For example, when a radio sensor module does not acknowledge the control module the control module may permit the engine of the vehicle to be started and the vehicle placed in gear. When a brake pedal sensor module does not acknowledge the control module, the control module may not permit the engine of the vehicle to be started. When a cruise control sensor module does not acknowledge the control module, the control module may permit the engine of the vehicle to be started but may not permit the vehicle to be placed in gear.

In some implementations, the check of drive-by-wireless system components may be performed while the vehicle is in operation. When the drive-by-wireless system detects the failure of a component (e.g., a component does not acknowledge a request to acknowledge message within a predetermined amount of time), the drive-by-wireless system may warn the driver of the vehicle and/or perform an orderly shut-down of the drive-by-wireless system.

When the sensor module detects a control action by the driver of the vehicle (step 220), the sensor module transmits a message that includes the vehicle VIN to the control module (step 230). The control module receives the message from the sensor module (step 240) and determines whether the VIN included in the message matches the VIN of the vehicle (step 250). When the VIN included in the message does not match the VIN of the vehicle, the control module does not take any action (e.g., does not send a message to control a vehicle component and does not send an acknowledgement message).

When the VIN included in the message matches the VIN of the vehicle, the control module sends a message to control the vehicle component based on the message received (step 260). For example, when the sensor module sends a message that indicates that the steering wheel has been turned by the driver of the vehicle, the control module sends a message to the steering mechanism that controls the position of the front wheels of the vehicle in the direction as indicated by the message from the sensor module. When a sensor module sends a message that indicates that the brake pedal has been depressed by the driver of the vehicle, the control module sends a message to the braking system to apply the brakes based on the magnitude of the brake pedal depression.

When the vehicle component receives the message sent by the control module, the vehicle component responds based on the message received (step 270). For example, when the control module sends a message that indicates that the steering wheel has been turned by the driver of the vehicle, the control module sends a message to the steering mechanism that causes the steering mechanism to position the front wheels of the vehicle in the direction indicated by the message from the sensor module. When a sensor module sends a message that indicates that the brake pedal has been depressed by the driver of the vehicle, the control module sends a message to the braking system to apply the breaks based on the magnitude of the brake pedal depression.

In some implementations, the control module may include the vehicle VIN in the message sent to control the vehicle component in step 260. After receiving the message that includes the VIN, the vehicle component may compare the VIN of the message with the VIN of the vehicle. The vehicle component responds based on the message received only when the VIN included in the message matches the VIN of the vehicle.

The inclusion of the VIN in the message from the control module to the vehicle component may be beneficial. For example, such an inclusion of the VIN may provide an additional layer of security that diminishes the likelihood that external wireless messages could exercise control over a vehicle component.

Figure 3:
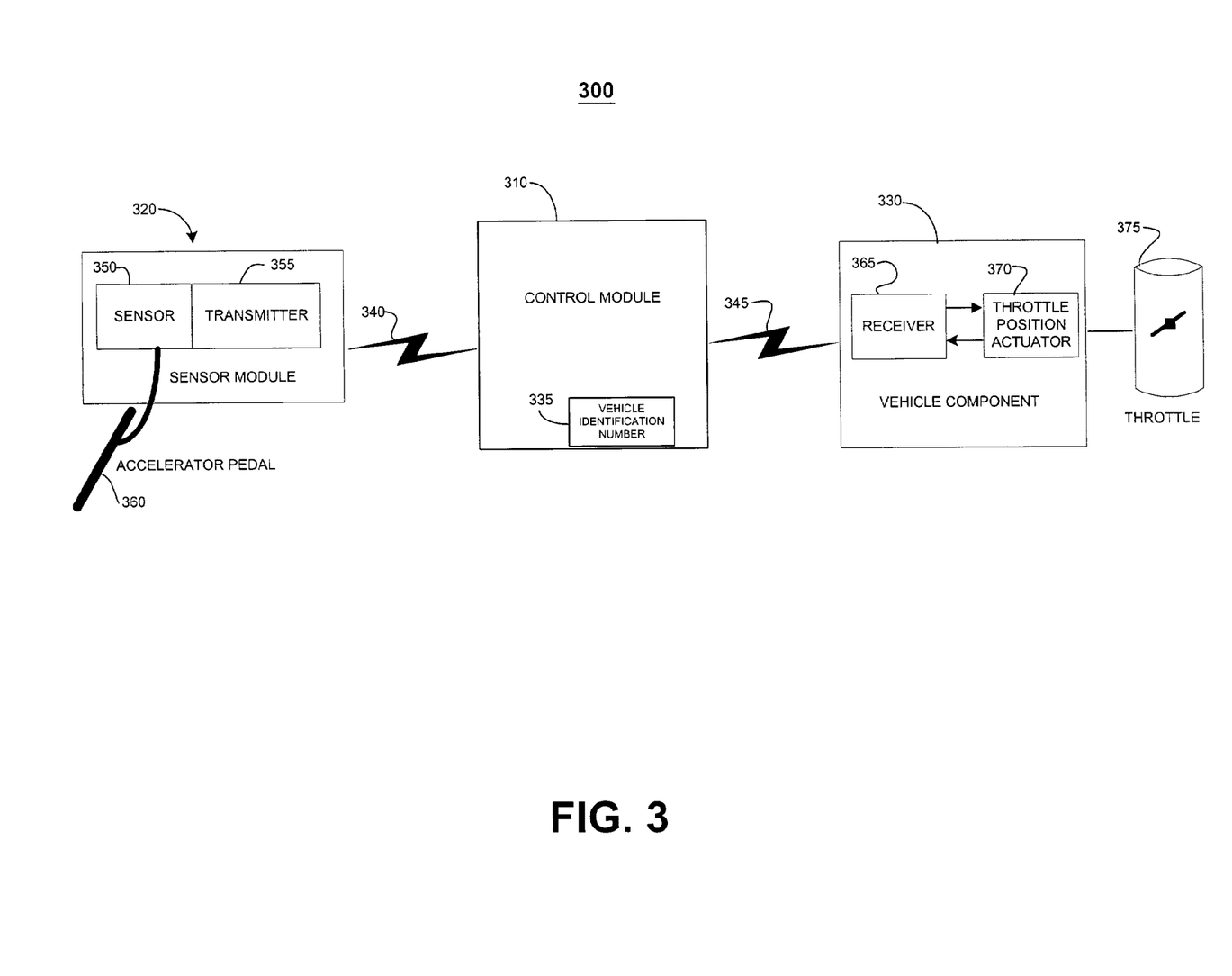
FIG. 3 is a block diagram of a drive-by-wireless system for controlling the acceleration of a vehicle.
Figure 4:
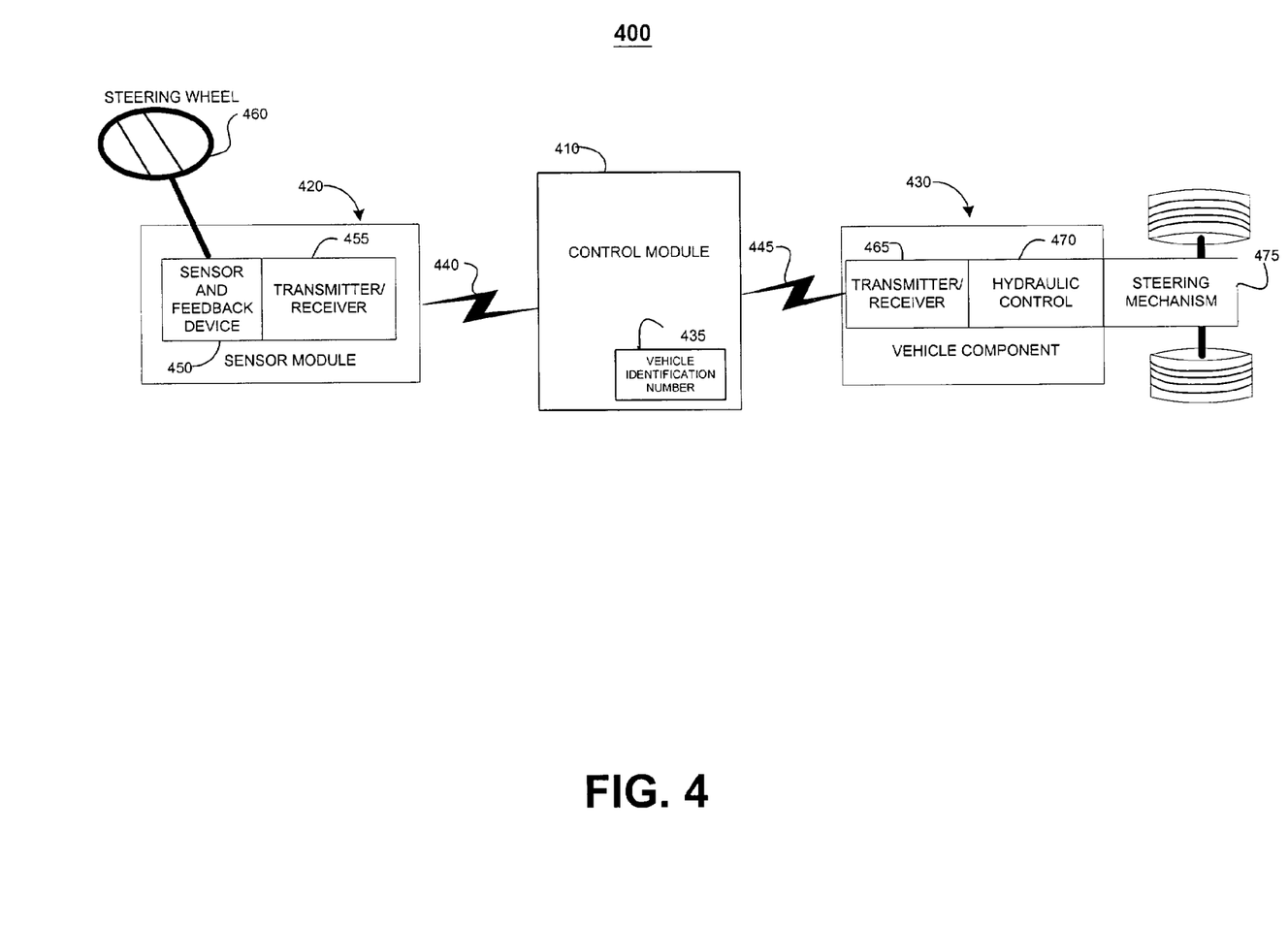
FIG. 4 is a block diagram of a drive-by-wireless system for controlling the steering of a vehicle.
Figure 5:
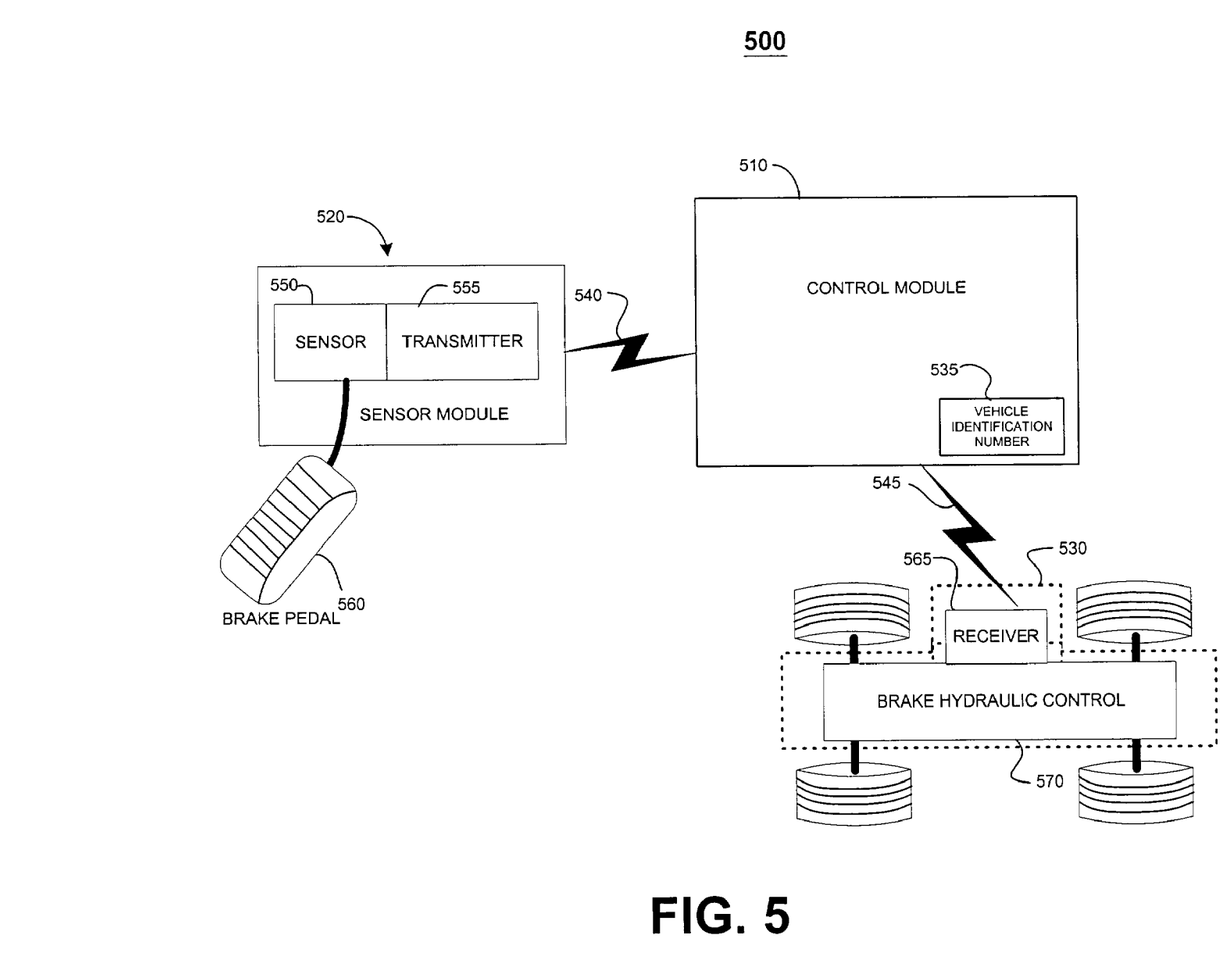
FIG. 5 is a block diagram of a drive-by-wireless system for controlling the braking of a vehicle.

For illustrative purposes, FIGS. 3–5 describe particular implementations of aspects of a drive-by-wireless system. FIG. 3 shows a block diagram of a drive-by-wireless system 300 that may be used to control the acceleration of a vehicle. The drive-by-wireless system 300 includes a control module 310, a sensor module 320, and a vehicle component 330 that may constitute implementations of, respectively, the control module 110, the sensor module 120, and the vehicle component 130 of FIG. 1.

The control module 310 includes a vehicle identification number 335 (VIN) that corresponds to the unique identifier for the vehicle. The VIN may be stored in memory or data storage of the control module 310. The control module 310 communicates with sensor module 320 through a wireless communication pathway 340 that corresponds generally to wireless communication pathway 185 of FIG. 1. The control module 310 communicates with vehicle component 330 through a wireless communication pathway 345 that corresponds generally to wireless communication pathway 195 of FIG. 1.

The sensor module 320 includes a sensor 350 and a transmitter 355. The sensor 320 is connected to an accelerator pedal 360 of the vehicle and generates a signal corresponding to the position of the accelerator pedal. The transmitter 355 sends wireless communications to the control module 310 in response to the signal from the sensor 320.

The vehicle component 330 includes a receiver 365 and a throttle position actuator 370. The receiver 365 receives messages from the control module 310 and provides signals to the throttle position actuator 370. The throttle position actuator 375 controls the position of throttle 375 in response to signals from the receiver 365.

When a driver of the vehicle steps on the accelerator pedal 360, the sensor 350 detects the magnitude of the accelerator pedal press (e.g., how far the driver depresses the accelerator pedal 360). The sensor 350 converts the magnitude of the accelerator pedal press to a digital signal and provides the signal to the transmitter 355. The sensor module 320 uses the transmitter 355 to send to the control module 310 through wireless pathway 340 a message that includes the VIN of the vehicle and the magnitude of the accelerator pedal press.

The control module 310 receives the message sent by the sensor module 320 and determines whether the VIN included in the received message matches the VIN 335 stored by the control module 310. When the VIN included in the received message matches the VIN 335 stored by the control module 310, the control module 310 sends to the vehicle component 330 through wireless pathway 345 a message that includes the magnitude of the accelerator pedal press. The receiver 365 of the vehicle component 330 receives the message sent by the control module 310. The receiver 365 extracts the magnitude of the accelerator pedal press from the messages and sends the magnitude signal to the throttle position actuator 370, which moves the throttle 375 to a position that corresponds to the magnitude of the pedal press.

In some implementations, the sensor module also may include a receiver. The vehicle component also may include a transmitter. When the sensor module includes a receiver and the vehicle component includes a transmitter, the control module may receive an acknowledgment message from the vehicle component and send an acknowledgment message to the sensor module. Other software engineering techniques may be used to perform handshaking between the components of the drive-by-wireless system 300.

FIG. 4 shows a block diagram of a drive-by-wireless system 400 that may be used to control the steering of a vehicle (e.g., the direction in which the vehicle travels). The drive-by-wireless system 400 includes a control module 410, a sensor module 420, and a vehicle component 430 that may constitute implementations of, respectively, the control module 110, the sensor module 120, and the vehicle component 130 of FIG. 1.

The control module 410 includes a vehicle identification number 435 (VIN) that corresponds to the unique identifier for the vehicle. The VIN may be stored in memory or data storage of the control module 410. The control module 410 communicates with sensor module 420 through a wireless communication pathway 440 that corresponds generally to wireless communication pathway 185 of FIG. 1 or wireless communication pathway 340 of FIG. 3. The control module 410 communicates with vehicle component 430 through a wireless communication pathway 445 that corresponds generally to wireless communication pathway 195 of FIG. 1 or wireless communication pathway 345 of FIG. 3.

The sensor module 420 includes a sensor and a feedback device 450 and transmitter/receiver 455. The sensor 420 is connected to a steering wheel 460 of the vehicle and generates a signal corresponding to the position of the steering wheel. The transmitter/receiver 455 sends wireless communications to the control module 410 in response to the signal from the sensor 420.

The vehicle component 430 includes a transmitter/receiver 465 and a hydraulic control 470. The transmitter/receiver 465 receives messages from the control module 410 and provides signals to the hydraulic control 470 in response to signals received from the transmitter/receiver 465. The hydraulic control 470 controls the steering mechanism 475 that controls the direction in which the vehicle travels.

When a driver of the vehicle turns the steering wheel 460, the sensor and feedback device 450 detects the magnitude and the direction of the steering wheel turn. The sensor and feedback device 450 converts the magnitude and the direction of the steering wheel turn to a digital signal and provides the signal to the transmitter/receiver 455. The sensor module 420 uses the transmitter 455 to send to the control module 410 through wireless pathway 440 a message that includes the VIN of the vehicle and the magnitude and the direction of the steering wheel turn.

The control module 410 receives the message sent by the sensor module 420 and determines whether the VIN included in the received message matches the VIN 435 stored by the control module 410. When the VIN included in the received message matches the VIN 435 stored by the control module 410, the control module 410 sends to the vehicle component 430 through wireless pathway 445 a message that includes the direction and the magnitude of the steering wheel turn. The transmitter/receiver 465 of the vehicle component 430 receives the message sent by the control module 410. The transmitter/receiver 465 extracts the magnitude and direction of the steering wheel turn from the message and sends the magnitude and direction signal to the hydraulic control 470, which controls the steering mechanism 475 based on the received signal.

The transmitter/receiver 465 sends a feedback message, or other type of acknowledgment message, to the control module 410. The control module forwards the received feedback message, or other type of acknowledgement message, to the transmitter/receiver 455 of the sensor module 420. The sensor and feedback device 450 provides appropriate feedback to the steering wheel 460 based on the message received.

FIG. 5 shows a block diagram of a drive-by-wireless system 500 that may be used to control the braking of a vehicle. The drive-by-wireless system 500 includes a control module 510, a sensor module 520, and a vehicle component 530 that may constitute implementations of, respectively, the control module 110, the sensor module 120, and the vehicle component 130 of FIG. 1.

The control module 510 includes a vehicle identification number 535 (VIN) that corresponds to the unique identifier for the vehicle. The VIN may be stored in memory or data storage of the control module 510. The control module 510 communicates with sensor module 520 through a wireless communication pathway 540 that corresponds generally to wireless communication pathway 185 of FIG. 1, wireless communication pathway 340 of FIG. 3, or wireless communication pathway 440 of FIG. 4. The control module 510 communicates with vehicle component 530 through a wireless communication pathway 545 that corresponds generally to wireless communication pathway 195 of FIG. 1, wireless communication pathway 345 of FIG. 3, or wireless communication pathway 445 of FIG. 4.

The sensor module 520 includes a sensor 550 and a transmitter 555. The sensor 520 is connected to a brake pedal 560 of the vehicle and generates a signal corresponding to the position of the brake pedal. The transmitter 555 sends wireless communications to the control module 510 in response to the signal from the sensor 520.

The vehicle component 530 includes a receiver 565 and brake hydraulic control 570. The receiver 565 receives messages from the control module 510 and provides signals to the brake hydraulic control 570. The brake hydraulic control 570, in response to signals from the receiver 565, controls the brake hydraulic system that applies the vehicle brakes.

When a driver of the vehicle steps on the brake pedal 560, the sensor 550 detects the magnitude of the brake pedal press (e.g., how far the driver depresses the brake pedal 560). The sensor 550 converts the magnitude of the brake pedal press to a digital signal and provides the signal to the transmitter 555. The sensor module 520 uses the transmitter 555 to send to the control module 510 through wireless pathway 540 a message that includes the VIN of the vehicle and the magnitude of the brake pedal press.

The control module 510 receives the message sent by the sensor module 520 and determines whether the VIN included in the received message matches the VIN 535 stored by the control module 510. When the VIN included in the received message matches the VIN 535 stored by the control module 510, the control module 510 sends to the vehicle component 530 through wireless pathway 545 a message that includes the magnitude of the brake pedal press. The receiver 565 of the vehicle component 530 receives the message sent by the control module 510. The receiver 565 extracts the magnitude of the brake pedal from the message and sends the magnitude signal to the brake hydraulic control 570, which controls the brake hydraulic system based on received the magnitude signal.

In some implementations, the sensor module also may include a receiver. The vehicle component also may include a transmitter. When the sensor module includes a receiver and the vehicle component includes a transmitter, the control module may receive an acknowledgment message from the vehicle component and send an acknowledgment message to the sensor module. Other software engineering techniques may be used to perform handshaking between the components of the drive-by-wireless system 500.

The described drive-by-wireless techniques are not limited to the illustrated implementations. For example, other control actions by a driver may be detected by a sensor module. Other control actions that may be controlled by drive-by-wireless vehicle control techniques may, for example, include activating cruise control operation, deactivating cruise control operation, opening or closing a power window, opening or closing a sun roof, controlling a headlamp, controlling a fog light, controlling a rear window defroster, and controlling an entertainment device (such as increasing the volume of a radio, decreasing the volume of a compact disc (CD) player, or starting to play a DVD in a DVD player.

In some implementations, drive-by-wireless techniques in a vehicle may be used with more than one sensor module to control more than one vehicle component. A drive-by-wireless system also may include a sensor module and a vehicle component with no control module. In such an implementation, the functions of the control module may be performed by the sensor module and/or the vehicle component.

Although the techniques have been described as responding to a control action performed by a driver of a vehicle, some implementations may permit the control actions detected by a sensor module to be performed by a passenger of a vehicle. For example, a sensor module that may detect a control action related to an entertainment device or a navigation device and respond appropriately without regard to whether the driver or passenger performed the control action.

Implementations may include a method or process, an apparatus or system, or computer software on a computer medium. It will be understood that various modifications may be made. For example, the techniques described still could be used if steps of the disclosed techniques were performed in a different order and/or if components in the disclosed systems were combined in a different manner and/or replaced or supplemented by other components.

Other implementations are within the scope of the following claims.

What is claimed is:

1. A method for controlling a component in a vehicle, the method comprising:
   detecting a control action in a vehicle;
   sending a message using a wireless communication pathway, the message describing the detected control action and including a vehicle identification number;
   receiving the message;
   determining whether the vehicle identification number included in the message matches a vehicle identification number of a vehicle at which the message is received; and
   when the vehicle identification number matches, controlling a component of the vehicle based on the received message.

2. The method of claim 1 wherein:
   detecting a control action comprises detecting an accelerator pedal being pressed, and
   controlling a component of the vehicle comprises controlling a throttle of the vehicle.

3. The method of claim 1 wherein:
   detecting a control action comprises detecting the turning of a steering wheel, and
   controlling a component of the vehicle comprises controlling a steering mechanism of the vehicle.

4. The method of claim 1 wherein:
   detecting a control action comprises detecting a brake pedal being pressed, and
   controlling a component of the vehicle comprises controlling a hydraulic brake system of the vehicle.

5. The method of claim 1 further comprising sending an acknowledgment message using the wireless communication pathway, the acknowledgment message including the vehicle identification number of the vehicle.

6. The method of claim 1 further comprising:
   determining whether the wireless communication pathway is operational; and
   permitting the engine of the vehicle to be started or permitting the vehicle to be placed in gear only when the wireless communication pathway is operational.

7. A computer-readable medium or propagated signal having embodied thereon a computer program configured to control a component in a vehicle, the medium or signal comprising one or more code segments configured to:
   detect a control action in a vehicle;
   send a message using a wireless communication pathway, the message describing the detected control action and including a vehicle identification number;
   receive the message;
   determine whether the vehicle identification number included in the message matches a vehicle identification number of a vehicle at which the message is received; and
   when the vehicle identification number matches, control a component of the vehicle based on the received message.

8. The medium or signal of claim 7 wherein:
   detecting a control action comprises detecting an accelerator pedal being pressed, and
   controlling a component of the vehicle comprises controlling a throttle of the vehicle.

9. The medium or signal of claim 7 wherein:
   the one or more code segments configured to detect a control action comprises one or more code segments configured to detect the turning of a steering wheel, and
   the one or more code segments configured to control a component of the vehicle comprises one or more code segments configured to control a steering mechanism of the vehicle.

10. The medium or signal of claim 7 wherein:
    the one or more code segments configured to detect a control action comprises one or more code segments configured to detect a brake pedal being pressed, and the one or more code segments configured to control a component of the vehicle comprises one or more code segments configured to control a hydraulic brake system of the vehicle.

11. The medium or signal of claim 7 further comprising one or more code segments configured to send an acknowledgment message using the wireless communication pathway, the acknowledgment message including the vehicle identification number of the vehicle.

12. The medium or signal of claim 7 further comprising one or more code segments configured to:
determine whether the wireless communication pathway is operational, and
permit the engine of the vehicle to be started or permit the vehicle to be placed in gear only when the wireless communication pathway is operational.

13. A system for controlling a component in a vehicle, the system comprising a control module wirelessly connected to one or more sensor modules and one or more vehicle components, wherein:
the one or more sensor modules include a wireless transmitter and are configured to:
detect a control action in a vehicle and,
send a first message using a wireless communication pathway, the message describing the detected control action and including a vehicle identification number;
the control module includes a wireless communication controller and a processor configured to:
receive the first message, determine whether the vehicle identification number included in the first message matches a vehicle identification number of a vehicle at which the first message is received, and
when the vehicle identification number matches, send a second message using a second wireless communication pathway to one of the one or more vehicle components; and
the one or more vehicle components include a wireless receiver and are configured to:
receive the second message, and
control a component of the vehicle based on the received second message.

14. The system of claim 13 wherein:
the one or more sensor modules configured to detect a control action comprise one or more sensor modules configured to detect an accelerator pedal being pressed, and
the one or more vehicle components configured to control a component of the vehicle comprises one or more vehicle components configured to control a throttle of the vehicle.

15. The system of claim 13 wherein:
the one or more sensor modules configured to detect a control action comprise one or more sensor modules configured to detect the turning of a steering wheel, and
the one or more vehicle components configured to control a component of the vehicle comprises one or more vehicle components configured to control a steering mechanism of the vehicle.

16. The system of claim 13 wherein:
the one or more sensor modules configured to detect a control action comprise one or more sensor modules configured to detect a brake pedal being pressed, and
the one or more vehicle components configured to control a component of the vehicle comprises one or more vehicle components configured to control a hydraulic brake system of the vehicle.

17. The system of claim 13 wherein:
the control module is further configured to send an acknowledgment message using the wireless communication pathway, the acknowledgment message including the vehicle identification number of the vehicle;
one or more of the one or more sensor modules include a wireless receiver and are configured to receive the acknowledgment message;
one or more of the one or more vehicle components include a transmitter and are further configured to send a second acknowledgment message using the wireless communication pathway, the acknowledgment message including the vehicle identification number of the vehicle; and
the control module is further configured to receive the second acknowledgment message.

18. The system of claim 13 wherein the control module is further configured to:
determine whether the wireless communication pathway is operational; and
permit the engine of the vehicle to be started or permit the vehicle to be placed in gear only when the wireless communication pathway is operational.

19. The system of claim 13 wherein the vehicle is an automobile, a bus, a truck, or a train.

20. A vehicle that includes the system of claim 13.

* * * * *